United States Patent
Huang

(10) Patent No.: US 6,227,449 B1
(45) Date of Patent: May 8, 2001

(54) OPTICAL PATH FOLDING APPARATUS FOR OPTICAL SCANNER

(75) Inventor: Yin-Chun Huang, Hsinchu (TW)

(73) Assignee: Umax Data Systems Inc., Hsinchu (TW)

( * ) Notice: Subject to any disclaimer, the term of this patent is extended or adjusted under 35 U.S.C. 154(b) by 0 days.

(21) Appl. No.: 09/413,863

(22) Filed: Oct. 7, 1999

(51) Int. Cl.⁷ ........................................... G06K 7/10
(52) U.S. Cl. ............................. 235/454; 235/487
(58) Field of Search ................................ 235/454, 487

(56) References Cited

U.S. PATENT DOCUMENTS 5,912,447 * 6/1999 Bjorner et al. ................ 235/454

FOREIGN PATENT DOCUMENTS 0 494 647 A2 * 5/1992 (EP).

* cited by examiner

*Primary Examiner*—Harold I. Pitts
(74) *Attorney, Agent, or Firm*—Dougherty & Troxell

(57) ABSTRACT

An optical path folding apparatus for optical scanner includes a light source, a reflection means, a lens and a charged couple device (CCD). The light source provides light which is reflected by the reflection means to the lens for converging to form light image on the CCD. The reflection means constitutes at least three reflecting mirrors which has at least one double side reflecting mirror which in turn has a first and a second reflection surface. Light transmitted in the reflection means is reflected at least once on the first and second reflection surface respectively.

8 Claims, 4 Drawing Sheets

OPTICAL PATH FOLDING APPARATUS FOR OPTICAL SCANNER

BACKGROUND OF THE INVENTION

1. Field of the Invention

This invention relates to an optical path folding apparatus for optical scanner and particularly to an optical path folding apparatus that has a double side reflecting mirror.

2. Description of the Prior Art

Optical scanner employs a principle of using an optical path folding apparatus to reflect light to a lens for forming a light image, then using a charged coupled device (CCD) to convert the light image to digital signals for computer process. Optically, it needs a certain length of optical path to form the light image required. If the optical path is stretched linearly, the optical path folding apparatus will become too bulky and is against the contemporary design concept of small size and light weight for electronic devices. Hence the optical path folding apparatus used in the contemporary scanners mostly uses a plurality of reflecting mirrors to squeeze the overall size while still get the optical length needed. The number, size and configuration of the reflecting mirrors directly affect the size and weight of the optical path folding apparatus and indirectly affect the size and weight of the scanner.

Most conventional scanners have four pieces of reflecting mirrors in the optical path folding apparatus. Each reflecting mirror does one light receiving and reflection. This four-mirror structure is bulky, heavy and costs higher. It thus does not suit well with the contemporary design trend set forth above.

Taiwan (R.O.C.) patent application number 79207828 (hereinafter will be referred to as "Prior Art 1") discloses an optical path folding apparatus for scanner that includes three pieces of reflecting mirrors. It has four light reflections with two light reflections taking place on the first reflection mirror. While it reduces somewhat the size and weight of the optical path folding apparatus, the two light reflections on the first reflecting mirror do not fall on the same spot. Therefore the size of the first reflecting mirror has to be increased which undercuts size and weight shrinking effect. Taiwan (R.O.C.) patent application number 85211358 (hereinafter will be referred to as "Prior Art 2") discloses another optical path folding apparatus which has three pieces of reflecting mirrors. Through arranging the position and angle of the reflecting mirrors, at least one mirror has two or more reflections taking place on same spot with different light incident angles. It has smaller size than that of the Prior Art 1. However the Prior Art 2 creates a new problem, i.e., producing diffracting light when incident light falling on the same spot of the reflecting mirror. It will downgrade scanning quality. Therefore there is still room for improvement regarding the optical, path folding apparatus.

SUMMARY OF THE INVENTION

It is an object of this invention to provide an optical path folding apparatus that includes at least three pieces of reflecting mirror which has at least one mirror being double side reflective. Through proper arrangement of the mirrors position and angle, the first and second reflection surface of the. double side reflecting mirror have respectively a light reflection. The diffracting light phenomenon thus may be avoided. The size, weight and production cost of the optical path folding apparatus may be reduced.

The optical path folding apparatus according to this invention includes a light source, a reflection means, a lens and a charged coupled device. (CCD). The light source provides light for scanning a document image. The reflection means receives image light, reflects the image light to an optical length desired and projects the image light to the lens which converges the image light to the CCD. The CCD converts the image light to digital signals for computer process. The reflection means includes at least one double size reflecting mirror which has a first reflection surface and a second reflection surface for respectively receiving and reflecting the image light once.

The reflection means has a plurality of reflecting mirrors, which enables the scanner to obtain required optical path at a smaller size and lighter weight. The double size reflecting mirror enables light reflection taking place at different spot so that diffracting light phenomenon may be avoided. It helps to improve scanning quality.

BRIEF DESCRIPTION OF THE DRAWINGS

The invention, as well as its many advantages, may be further understood by the following detailed description and drawings in which.

DETAILED DESCRIPTION OF THE PREFERRED EMBODIMENT

Figure 1:
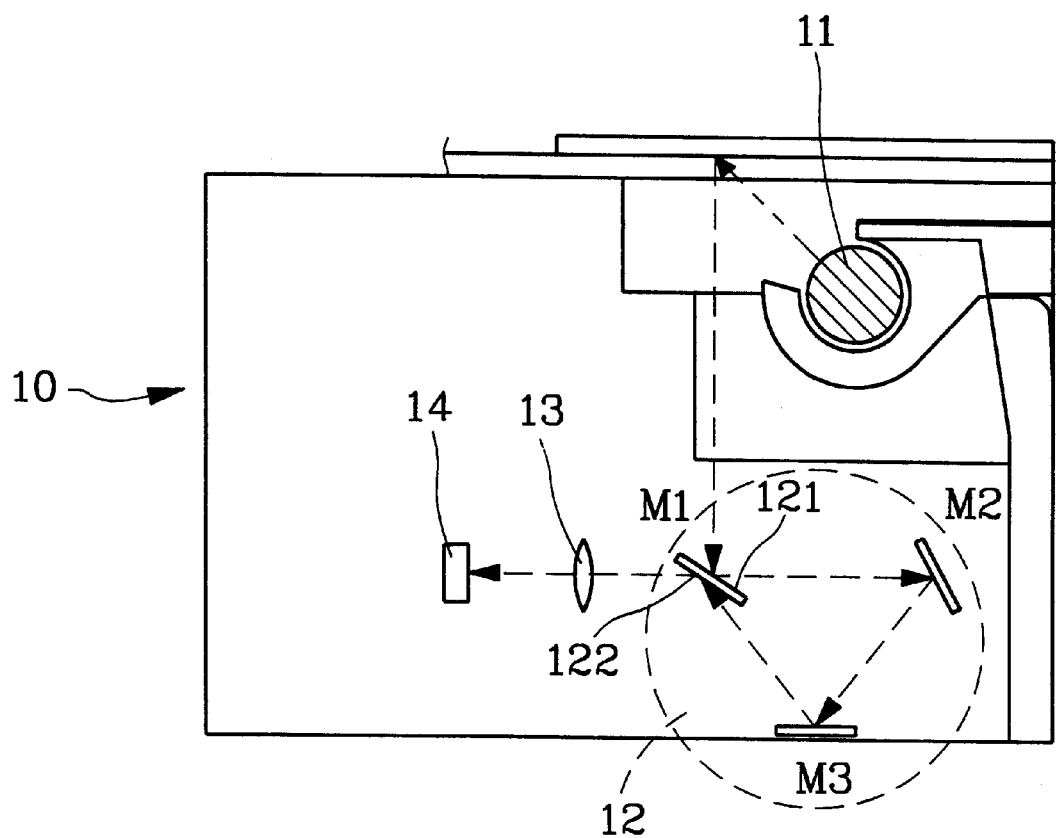
FIG. 1 is a schematic view of this invention.

Referring to FIG. 1, the optical path folding apparatus 10 of this invention includes a light source 11, a reflection means 12, a lens 13 and a charged couple device (CCD) 14.

The light source 11 may includes a lamp tube for providing light (shown by broken lines in FIG. 1) for scanning a document image.

The reflection means 12 includes at least three reflecting mirrors. FIG. 1 embodiment includes a first reflecting mirror M1 which is a double side reflecting mirror that constitutes a first reflection surface 121 and a second reflection surface 122 opposite to the first reflecting surface, a second reflecting mirror M2 and a third reflecting mirror M3. The three reflecting mirrors are positioned in selected angles to receive light from the light source 11 and to project image light to the lens 13.

The lens 13 converges the image light to the CCD 14 which in turn converts the image light to digital signals for computer process and completes the whole scanning operation.

In this embodiment, the mirrors are so arranged that the first reflection surface 121 receives the image light of the document first. The image light then is reflected to the second reflecting mirror M2, then to the third reflecting mirror M3 and back again to the first reflecting mirror M1 but on the second reflection surface 122, and then is projected to the lens 13. The light path can be depicted as: light source 11→M1 (121)→M2→M3→M1 (122)→lens 13. It includes four reflections on three reflecting mirrors.

Figure 2:
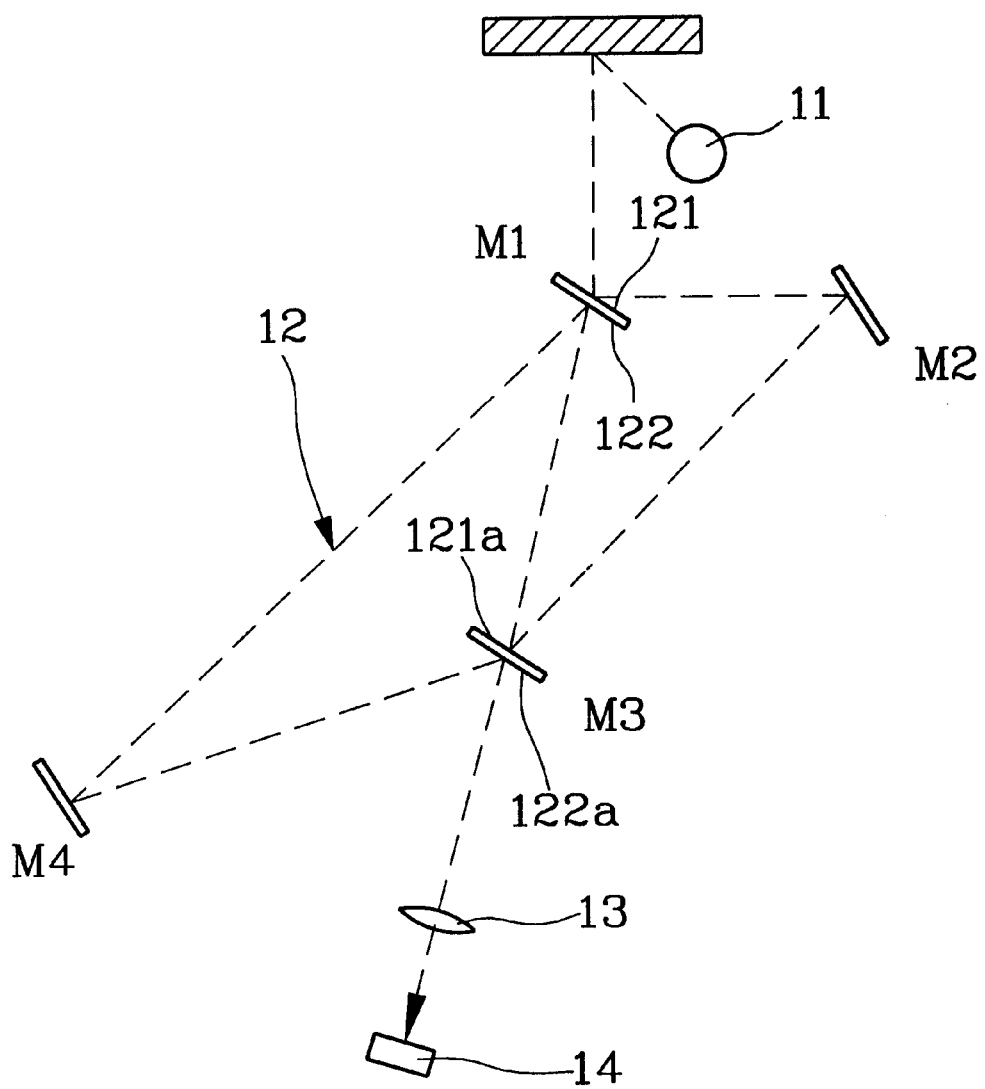
FIG. 2 is a first embodiment variation of this invention.

FIG. 2 illustrates a first embodiment variation of this invention. Similar components will be marked by similar numerals as shown in FIG. 1. The reflection means 12 of the optical path folding apparatus includes four reflecting mirrors. The second and fourth reflecting mirrors M2 and M4 are single side reflecting mirrors. The first and third reflecting mirrors M1 and M3 are double side reflecting mirrors. The first reflecting mirror M1 has a first reflection surface 121 and a second reflection surface 122. The third reflecting mirror M3 has a third reflection surface 121a and a fourth reflection surface 122a. The light path is: light source 11→M1 (121)=M2→M3 (121a)→M1 (122)→M4→M3 (122a) →lens 13. It includes six reflections on four mirrors.

Figure 3:
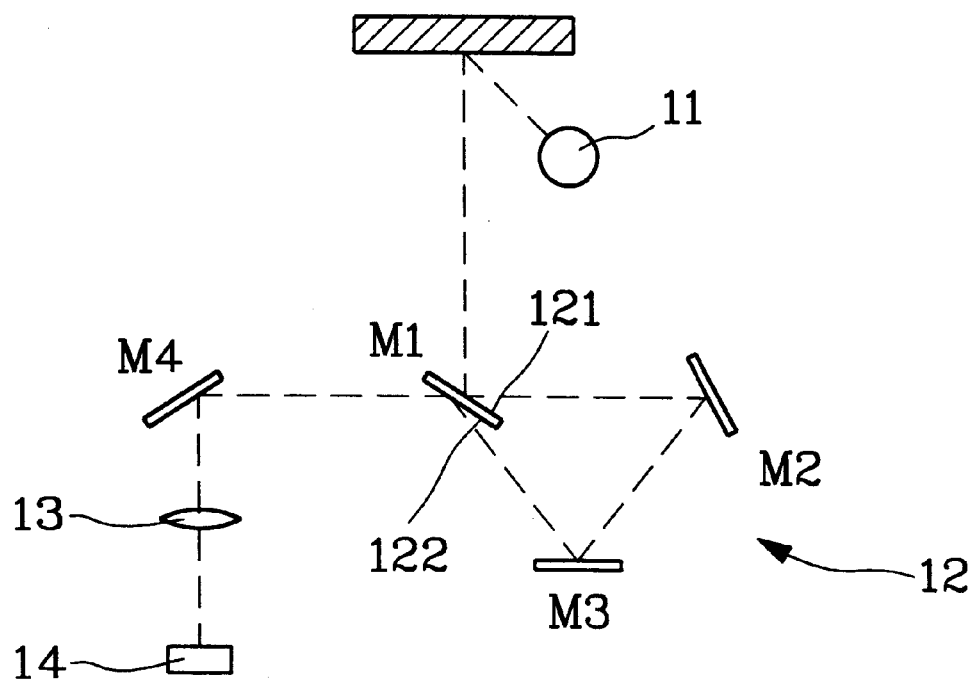
FIG. 3 is a second embodiment variation of this invention.

FIG. 3 illustrates a second embodiment variation of this invention. Like the one shown in FIG. 2, it also has four reflecting mirrors M1, M2, M3 and M4. However only the first reflecting mirror M1 is double side reflective which has a first and second reflecting surface 121 and 122. The light path is: light source 11→M1 (121)→M2→M3→M1 (122) →M4→lens 13. It includes five reflections on four mirrors.

Figure 4:
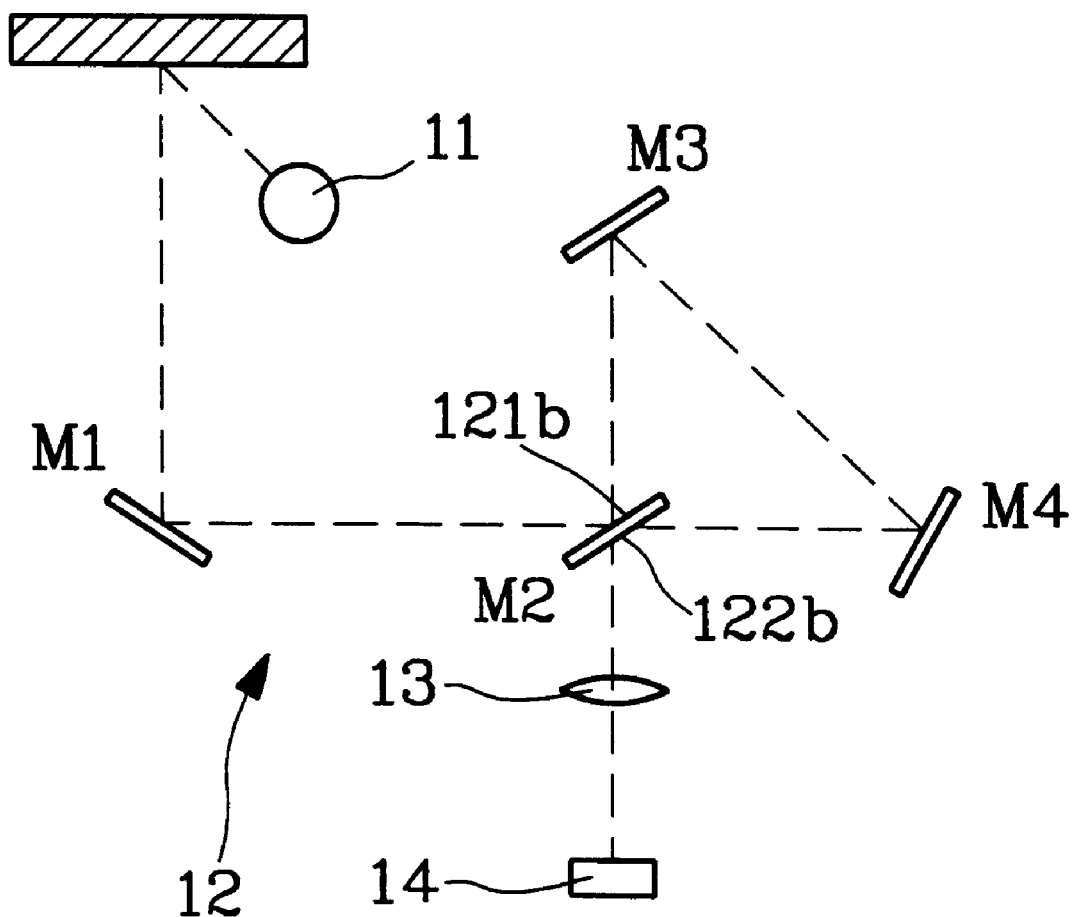
FIG. 4 is a third embodiment variation of this invention.

FIG. 4 depicts a third embodiment variation of this invention. Like the one shown in FIG. 3, it also has four reflecting mirrors M1, M2, M3 and M4. However only the second reflecting mirror M2 is double side reflective which has a first and second reflection surface 121b and 122b. The light path is: light source 11→M1→M2 (121b) →M3→M4→M2 (122b)→lens 13. It includes five reflections on four mirrors.

It is to be noted that five or more reflecting mirrors may also be used. However reflecting light energy will diminish with increasing number of reflecting mirrors. It is therefore preferably to include three or four reflecting mirrors to achieve the best possible result. The reflection surfaces of the double side reflecting mirrors is preferably made of plating or gluing two single side reflecting mirrors back to back.

By means of the structure and arrangement set forth above, a compact and light weight scanner may be made. As all light reflection will fall upon the reflection mirrors at different location, diffracting light phenomenon may be avoided for achieving high scanning quality.

It may thus be seen that the objects of the present invention set forth herein, as well as those made apparent from the foregoing description, are efficiently attained. While the preferred embodiment of the invention has been set forth for purpose of disclosure, modifications of the disclosed embodiment of the invention as well as other embodiment of the invention as well as other embodiments thereof may occur to those skilled in the art. Accordingly, appended claims are intended to cover all embodiments which do not depart from the spirit and scope of the invention.

What is claimed is:

1. An optical path folding apparatus for optical scanner, comprising:

a light source for providing light for optical scanning;

a reflection means including at least three reflecting mirrors arranged in a manner desired for receiving the light from the light source and reflecting the light to a desired direction;

a lens for receiving the light from the reflection means and converging the light on a focal point thereof; and a charged couple device located at the focal point for converting the light from the lens to digital signals for computer process;

wherein the reflection means includes at least one double side reflecting mirror which has a first reflection surface and a second reflection surface for respectively performing at least one light reflection thereon.

2. The optical path folding apparatus of claim 1, wherein the reflection means includes a first reflecting mirror M1 which has a first and a second reflection surface, a second reflecting mirror M2, and a third reflecting mirror M3, wherein light path is: the light source→the first reflection surface→M2→M3→the second reflection surface→the lens.

3. The optical path folding apparatus of claim 1, wherein the reflecting mirrors are made by plating a surface of the mirrors.

4. The optical path folding apparatus of claim 1, wherein the reflection means includes a first reflecting mirror which has a first and a second reflection surface, a second reflecting mirror M2, a third reflecting mirror M3 and a fourth reflecting mirror M4, wherein light path is: the light source→the first reflection surface→M2→M3→the second reflection surface→M4→the lens.

5. The optical path folding apparatus of claim 1, wherein the reflection means includes a first reflecting mirror M1, a second reflecting mirror which has a first reflection surface, and a second reflection surface, a third reflecting mirror M3 and a fourth reflecting mirror M4, wherein light path is: the light source→M1→the first reflection surface→M3→M4→the second reflection surface→the lens.

6. The optical path folding apparatus of claim 1, wherein the reflection means includes a first reflecting mirror which has a first and a second reflection surface, a second reflecting mirror M2, a third reflecting mirror which has a third and a fourth reflection surface, and a fourth reflecting mirror M4, wherein light path is: the light source→the first reflection surface→M2→the third reflection surface→the second reflection surface→M4→the fourth reflection surface→the lens.

7. The optical path folding apparatus of claim 1, wherein the double side reflecting mirror is made by plating both sides of the mirror.

8. The optical path folding apparatus of claim 1, wherein the double side reflecting mirror is made by gluing two single side reflecting mirrors on non-reflection surfaces.

\* \* \* \* \*